(12) United States Patent
Corpet et al.

(10) Patent No.: US 9,165,206 B2
(45) Date of Patent: Oct. 20, 2015

(54) UPDATING POINT OF INTEREST DATA BASED ON AN IMAGE

(71) Applicant: Google Inc., Mountain View, CA (US)

(72) Inventors: Pascal Corpet, Gockhausen (CH); Andrew John McGlinchey, Singapore (SG); Ammar Ibrahim, Zurich (CH); Iyad F. I. Assad, Ruschlikon (CH); Patrick Pui Wah Leung, Paris (FR); Jannine C. Versi, Boston, MA (US); Lucia Terrenghi, Adliswil (CH); Robert Allen Ryskamp, Mountain View, CA (US); Yariv Adan, Zug (CH); Steve Anthony Rogers, Kent (GB)

(73) Assignee: Google Inc., Mountain View, CA (US)

(*) Notice: Subject to any disclaimer, the term of this patent is extended or adjusted under 35 U.S.C. 154(b) by 171 days.

(21) Appl. No.: 13/711,512

(22) Filed: Dec. 11, 2012

(65) Prior Publication Data

US 2015/0169977 A1 Jun. 18, 2015

Related U.S. Application Data

(60) Provisional application No. 61/569,717, filed on Dec. 12, 2011.

(51) Int. Cl.
| | |
|---|---|
| *G06K 9/00* | (2006.01) |
| *G06K 9/46* | (2006.01) |
| *G06K 9/32* | (2006.01) |
| *G06F 17/30* | (2006.01) |

(52) U.S. Cl.
CPC ............ *G06K 9/46* (2013.01); *G06F 17/30047* (2013.01); *G06F 17/30241* (2013.01); *G06F 17/30244* (2013.01); *G06F 17/30247* (2013.01); *G06F 17/30253* (2013.01); *G06F 17/30265* (2013.01); *G06F 17/30289* (2013.01); *G06F 17/30345* (2013.01); *G06K 9/00456* (2013.01); *G06K 9/00624* (2013.01); *G06K 9/00637* (2013.01); *G06K 9/00664* (2013.01); *G06K 9/325* (2013.01); *G06K 9/3258* (2013.01)

(58) Field of Classification Search
USPC ......... 382/100, 103, 181, 182, 224, 229, 305, 382/306, 325; 707/915, 917–921, 940
See application file for complete search history.

(56) References Cited

U.S. PATENT DOCUMENTS

| | | | |
|---|---|---|---|
| 7,272,501 B2 | 9/2007 | Dorfman et al. | |
| 7,486,958 B2* | 2/2009 | Sheha et al. | ........... 707/999.003 |
| 7,917,286 B2 | 3/2011 | Taylor et al. | |
| 8,219,318 B2* | 7/2012 | Kreft | .............................. 701/445 |
| 8,265,400 B2* | 9/2012 | Yadid et al. | ................... 382/229 |
| 8,290,704 B2* | 10/2012 | Bai | ................................ 701/450 |
| 8,787,673 B2* | 7/2014 | Wu et al. | ....................... 382/182 |
| 2004/0204958 A1 | 10/2004 | Perkins et al. | |
| 2005/0270299 A1* | 12/2005 | Rasmussen et al. | .......... 345/552 |
| 2006/0080030 A1* | 4/2006 | Okude et al. | .................. 701/208 |
| 2007/0140595 A1* | 6/2007 | Taylor et al. | ................. 382/310 |

(Continued)

*Primary Examiner* — Eric Rush
(74) *Attorney, Agent, or Firm* — Dority & Manning, P.A.

(57) ABSTRACT

Various aspects of the subject technology relate to systems, methods, and machine-readable media for updating a point of interest (POI) data repository. A system may be configured to receive a communication comprising an image associated with a point of interest, extract textual data from the image, identify a portion of the textual data that corresponds to a point of interest (POI) field in a point of interest listing, and update the point of interest (POI) data repository based on the portion of the textual data that corresponds to the POI field.

19 Claims, 6 Drawing Sheets

(56) References Cited

U.S. PATENT DOCUMENTS

| | | |
|---|---|---|
| 2008/0002916 A1 | 1/2008 | Vincent et al. |
| 2009/0279794 A1* | 11/2009 | Brucher et al. ............... 382/225 |
| 2010/0250109 A1 | 9/2010 | Johnston et al. |
| 2011/0047182 A1* | 2/2011 | Shepherd et al. ............. 707/780 |
| 2011/0150324 A1* | 6/2011 | Ngan et al. .................... 382/159 |

* cited by examiner

100

POI Listing

| |
|---|
| Unique ID |
| Name |
| Location |
| Phone Number |
| POI Type |
| Related Terms |
| Hours |
| Website |
| Images |
| ... |

UPDATING POINT OF INTEREST DATA BASED ON AN IMAGE

RELATED APPLICATION

This application claims priority to U.S. Provisional Patent Application No. 61/569,717, filed on Dec. 12, 2011, and entitled "UPDATING A POINT OF INTEREST DATABASE BASED ON AN IMAGE," the contents of which are herein incorporated by reference in its entirety.

BACKGROUND

The present disclosure generally relates to information processing and, in particular, updating a point of interest data repository.

In some instances, a point of interest data repository is a memory store for information about all points of interest known to one or more systems. The point of interest (POI) data repository may contain a listing (e.g., a record) for each point of interest (e.g., a business, a landmark, a geographic area, or other location). The point of interest listing may contain information about a point of interest such as a POI name, an address, location coordinates, a phone number, a website, business hours (e.g., opening hours), one or more terms associated with the POI, etc.

The point of interest data repository may be used by one or more systems for a variety of applications. For example, POI listings stored in a POI data repository may be used to locate places of interest on a map or identify places of interest in local searches. POI listings may also be used to find directions from one location to another. Accordingly, having a robust and accurate point of interest (POI) data repository may improve the performance, functionality, and usability of the various applications that use a point of interest data repository. However, populating a POI data repository presents a number of difficulties, especially in certain regions around the world (e.g., emerging markets).

SUMMARY

According to another aspect of the subject technology, a system for updating a point of interest (POI) data repository is provided. The system may include one or more processors and a machine-readable medium comprising instructions stored therein, which when executed by the one or more processors, cause the one or more processors to perform operations. The operations may include receiving a communication comprising an image associated with a point of interest, extracting textual data from the image using optical character recognition, identifying a portion of the textual data that corresponds to a point of interest (POI) field, and updating the point of interest (POI) data repository based on the portion of the textual data that corresponds to the POI field.

According to one aspect of the subject technology, a method for updating a point of interest (POI) data repository is provided. The method may include receiving a communication comprising an image associated with a point of interest, extracting textual data from the image, identifying a portion of the textual data that corresponds to a point of interest (POI) field for a point of interest listing, and updating the point of interest (POI) data repository based on the portion of the textual data that corresponds to the POI field for the point of interest listing.

According to yet another aspect of the subject technology, a machine-readable medium including instructions stored therein, which when executed by a machine, cause the machine to perform operations for updating a point of interest (POI) data repository is provided. The operations may include receiving a communication comprising an image associated with a point of interest, extracting textual data from the image, identifying a portion of the textual data that corresponds to a point of interest (POI) field, and generating a new point of interest (POI) listing based on the portion of the textual data that corresponds to the POI field.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

FIG. 2 is a conceptual block diagram illustrating a POI listing, in accordance with various aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In accordance with various aspects of the subject technology, systems and methods for updating a point of interest (POI) information stored in a data repository based on an image are disclosed. For example, a system may be configured enable users (e.g., a business owner or other user) to capture images (e.g., photos) associated with a point of interest and transmit the images to the system. The images may include, for example, an image of a store front of a business, a business card, the interior of a point of interest (e.g., a business), or any other image associated with the POI.

The system may receive the user submitted images, extract POI information from the images, and update a POI data repository, such as a database, using the POI information extracted from the images. For example, the system may generate a new POI listing based on the POI information extracted from one or more of the user submitted images and store the new POI listing in the POI data repository. According to another aspect, the system may locate an existing POI listing in the POI data repository and update the POI listing based on the information extracted from one or more of the images.

By updating a point of interest data repository using images received from one or more users, the system may provide another means for adding point of interest listings to a POI data repository and maintaining an up-to-date POI data repository. Furthermore, the POI data repository may be updated without any new equipment and allows users (e.g., business owners) to participate in updating the POI data repository in quick and easy way.

Figure 1:
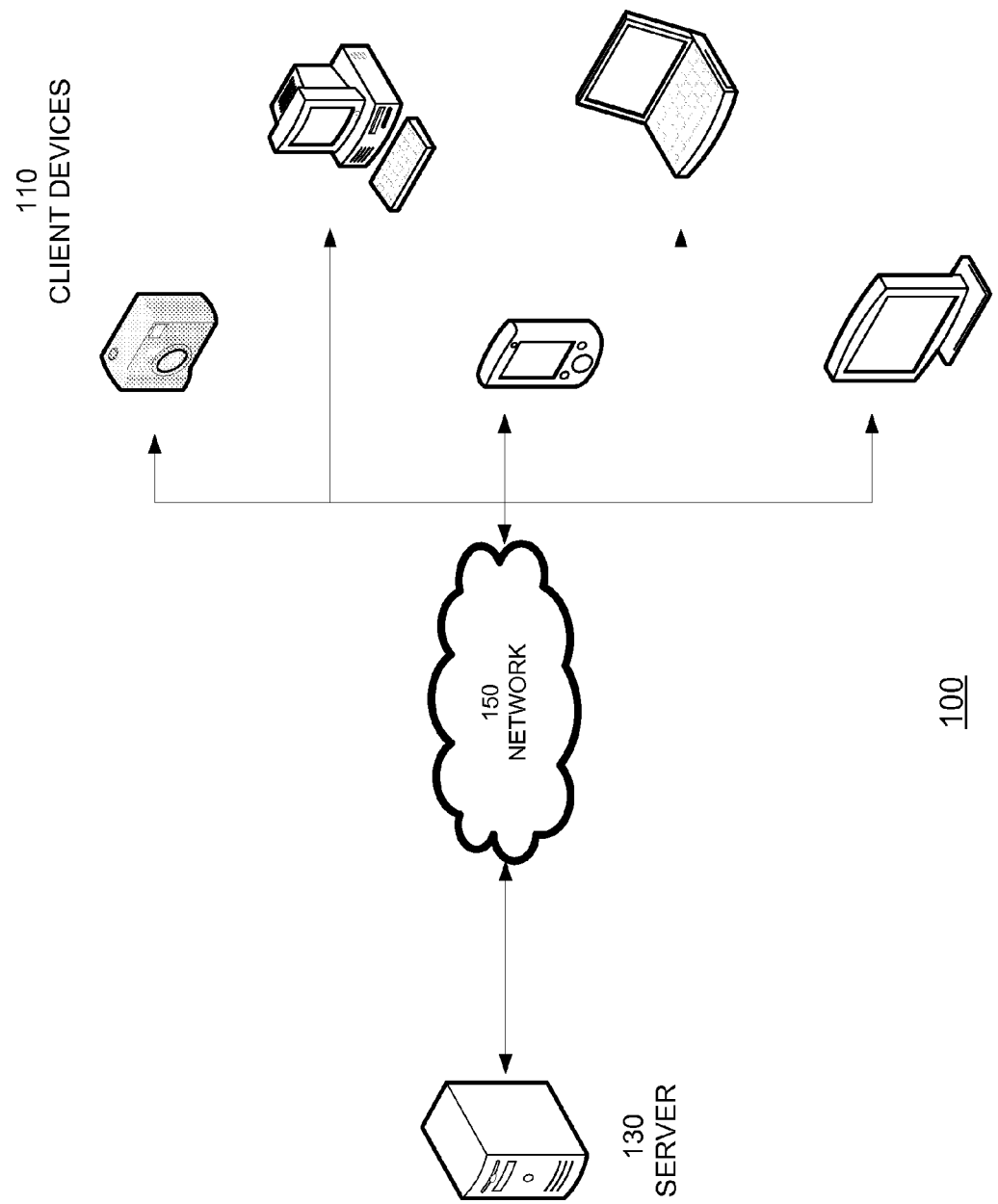
FIG. 1 is a block diagram illustrating a network environment in which a system for updating a point of interest (POI) data repository based on an image may exist, in accordance with one aspect of the subject technology.

FIG. 1 is a block diagram illustrating a network environment 100 in which a system for updating a POI data repository based on an image may exist, in accordance with one aspect of the subject technology. The network environment 100 includes a server 130 (e.g., a server entity) and one or more client devices 110 connected over a network 150. Although FIG. 1 illustrates a client-server network environment 100, other aspects of the subject technology may include other configurations including, for example, peer-to-peer environments or single system environments.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The server 130 may be implemented on any device, machine, or group of machines having a processor, a memory, and communications capability for providing one or more services with access to the POI data repository. For example, the server 130 may be configured to provide point of interest information to local search services, routing services, or mapping services. The server 130 may also include components that may be configured to store point of interest (POI) listings and update POI listings in POI data repository. In one aspect of the subject technology, the server 130 may be a single computing machine. However, in other aspects, the server 130 may be a virtual entity that might refer to a cluster or even multiple clusters of servers.

FIG. 2 is a conceptual block diagram illustrating a POI listing 200, in accordance with various aspects of the subject technology. Each POI listing 200 in a POI data repository may contain information about a point of interest such as a POI name, an address, location coordinates, a phone number, a website, business hours (e.g., opening hours), related terms, POI categories or characteristics, images (e.g., pictures) of the POI, or any other information about a point of interest.

Referring back to FIG. 1, the client devices 110 may include, for example, desktop computers, laptop computers, tablet computers, mobile devices (e.g., a smart phone or camera), thin clients, or any other devices having appropriate processor, memory, and communications capabilities. Each of the client devices 110 may be configured to transmit one or more images to the server 130. In some cases, a client device 110 may also be capable of capturing the image (e.g., a camera or a smart phone). In other cases, however, the image may be uploaded to the client device 110 (e.g., a desktop computer or other server) before the client device 110 transmits the image to the server 130.

Figure 3:
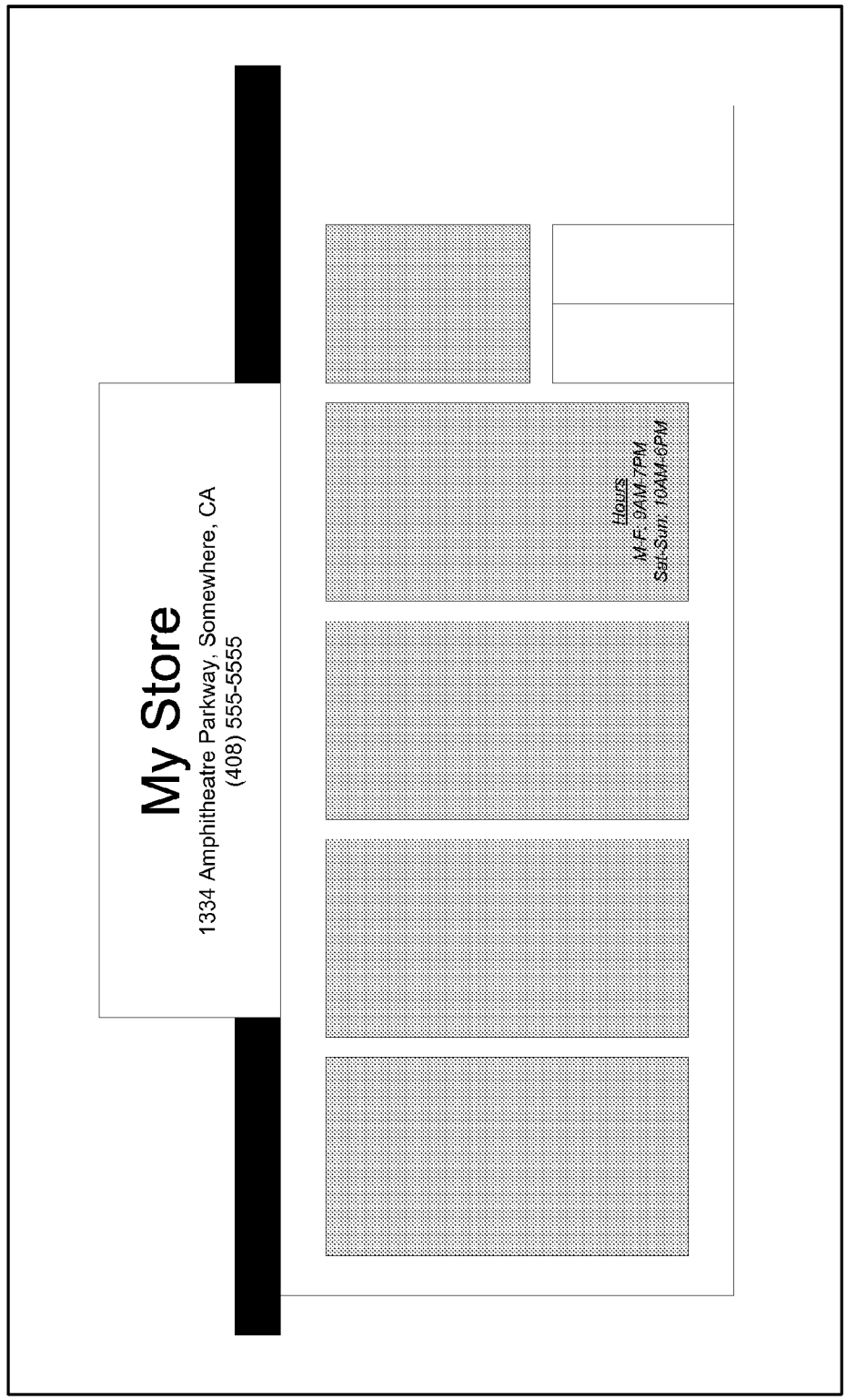
FIG. 3 is a conceptual diagram illustrating a image associated with a point of interest that may be captured by a user, in accordance with one aspect of the subject technology.

FIG. 3 is a conceptual diagram illustrating a image 300 associated with a point of interest that may be captured by a user, in accordance with one aspect of the subject technology. The image 300 illustrated in FIG. 3 may be an image of a storefront of a business and may be used to extract various pieces of information about the business. For example, the image may include the name of the business ("My Store"), an address associated with the business ("1234 Amphitheatre Parkway, Somewhere, Calif."), a telephone number for the business, and business hours (e.g., opening hours). The image may also include other visual cues that may be used to identify characteristics associated with the business.

Although FIG. 3 shows an image 300 of a storefront, other images used to update a POI data repository may include images of a business card, images of an advertisement, images of the interior of a point of interest (e.g., the interior of a business), or any other image associated with a point of interest. Additionally, in some aspects, more than one image associated with the point of interest may be captured and used to update a POI listing in the POI data repository. For example, the images may include one or more images of a storefront, one or more images of the interior of the point of interest, one or more images of a business card, or a combination of these images. Once the user captures the one or more images, the one or more images may be transmitted to a system where it may be analyzed and used to update a point of interest (POI) data repository. One example system is discussed with respect to FIG. 4.

Figure 4:
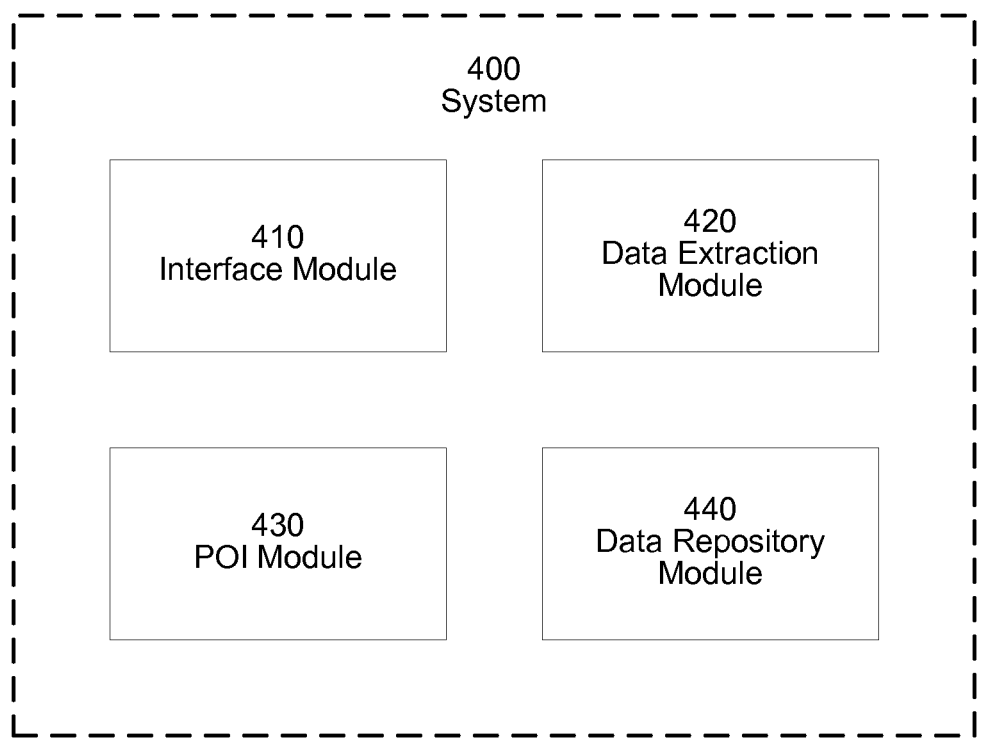
FIG. 4 is a conceptual block diagram illustrating a system configured to update a POI data repository based on one or more images received from a user, in accordance with various aspects of the subject technology.

FIG. 4 is a conceptual block diagram illustrating a system 400 configured to update a POI data repository based on one or more images received from a user, in accordance with various aspects of the subject technology. The various systems and modules illustrated in FIG. 4 may be comprised of software instructions encoded in a medium and executed by a processor, computer hardware components, or a combination of both. For example, the various systems and modules may each comprise one or more processors or memories that are used to perform the functions described below. The processors may include general purpose processors or special purpose logic circuitry, for example, a field programmable gate array (FPGA) or an application-specific integrated circuit (ASIC). According to another aspect, the various systems and modules may share one or more processors or memories.

The system 400 of FIG. 4 may include an interface module 410, an data extraction module 420, a point of interest (POI) module 430, and a data repository module 440. The interface module 410 may be configured to receive, through one or more methods, a communication from a client device that includes one or more images. For example, the interface module 410 may receive user submitted images through an website upload, as an email attachment or link, as a multimedia messaging service (MMS) message, or as another communication from an application on the client device.

The communication received by the interface module 410 may, in some cases, include other information associated with the point of interest. For example, an email or MMS message including an image may also include text from a user of the user's client device that describes one or more characteristics of the point of interest (e.g., a POI type, an address, location coordinates, etc.). A website that allows a user to upload an image may also provide additional information fields that allow a user to include textual descriptions or specify one or more characteristics (e.g., from a dropdown menu of options) of the point of interest.

The data extraction module 420 may be configured to extract data from each image received by the interface module 410. In one aspect, the data extraction module 420 may include a optical character recognition (OCR) component that may extract textual data from the image. In another aspect, the data extraction module 420 may also be able to extract other information associated with the image (e.g., textual descriptions or location coordinates in the communication received from the client device).

The POI module 430 may configured to determine that one or more portions of the extracted data corresponds with one or more point of interest fields (e.g., the name of a point of interest, the address of a point of interest, a telephone number for the point of interest, etc.). The data repository module 440 may be configured to update a point of interest (POI) data repository based on the portions of the extracted data that correspond to the POI fields.

For example, according to one aspect of the subject technology, the data repository module 440 may determine whether the portions of the textual data that correspond to POI fields match POI fields for POI listings in the POI data repository. For example, an image may contain textual data that the POI module 430 determines corresponds with a POI field (e.g., a POI name or phone number). The data repository module 440 may search the POI data repository for POI listings that corresponds with the textual data (e.g., the POI listing has a name or phone number that matches or closely matches the textual data in the image).

If no corresponding POI listing is found in the POI data repository, the data repository module 440 may generate a new POI listing using the textual data from the image (e.g., the POI name or phone number) and store the new POI listing in the POI data repository. According to one aspect, the data repository module 440 may also store the one or more images received by the interface module 410 in the new POI listing.

In some cases, before the new POI listing is stored in the POI data repository, additional listing verification procedures may be taken. In one aspect, the new POI listings may be placed in a queue for review by a system administrator (e.g., a human operator or another module). The system administrator may review the new POI listing for accuracy, quality, or correct formatting and, if the POI listing meets one or more standards, the system administrator may approve the addition of the new POI listing into the POI data repository.

If, on the other hand, a corresponding POI listing is found in the POI data repository, the data repository module 440 may compare the information in the POI listing with the textual data from the image and update the POI listing if needed. For example, if the textual data from the image includes a POI name and a POI phone number and a corresponding POI listing is found with the same name but different phone number, the data repository module 440 may update the phone number in the POI listing using the phone number in the textual data from the image or add the phone number from the image to the POI listing.

According to some aspects, the data repository module 440 may also update the corresponding POI listing by storing the one or more images received by the interface module 410 in the corresponding POI listing. Furthermore, any updates to POI listings in the POI data repository may also be placed in a queue for review and approval by a system administrator.

Although the example described above deals primarily with textual data extracted from an image, according to other aspects of the subject technology, the data repository module 440 may also search for POI listings in the POI data repository using any other data (e.g., textual descriptions about the POI, location coordinates for the POI, etc.) or combination of data extracted from the communication. For example, if the communication includes location coordinates associated with a business and an image of the business's storefront containing the business name and a telephone number for the business, the data repository module 440 may use all three pieces of information to search for a corresponding POI listing in the POI data repository.

If a POI listing is found with location coordinates within a threshold distance of the location coordinates from the client device, but the name or the phone number for the listing does not match the name and phone number extracted from the image, the data repository module 440 may update the name and phone number in the listing with the name and phone number extracted from the image. If no POI listing is found, the data repository module 440 may create a new POI listing to be stored in the POI listing using the location coordinates, name, and telephone number extracted from the communication from the client.

Figure 5:
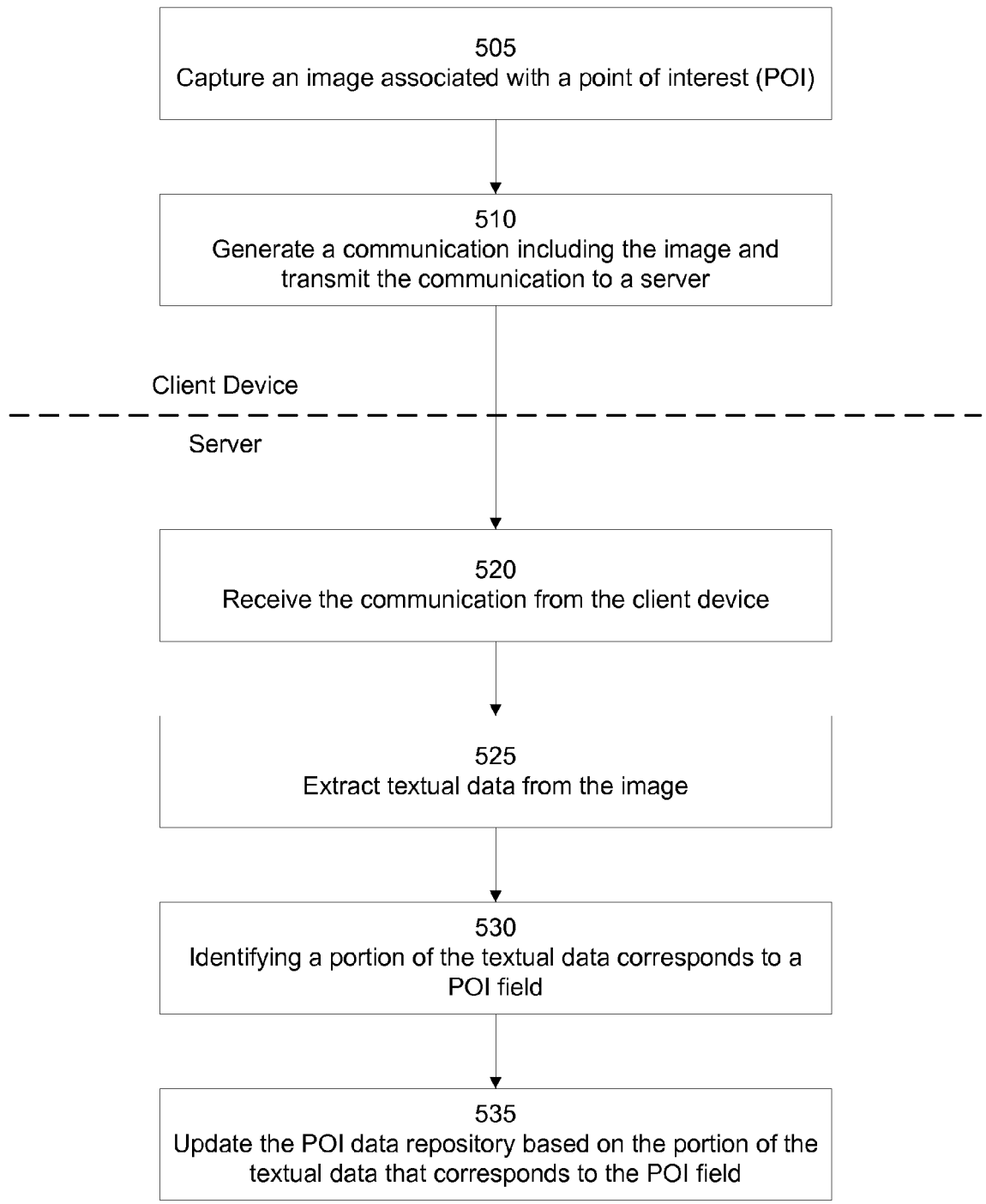
FIG. 5 is a flow chart illustrating a process for updating a POI data repository based on an image, in accordance with various aspects of the subject technology.

FIG. 5 is a flow chart illustrating a process 500 for updating a POI data repository based on an image, in accordance with various aspects of the subject technology. Although the operations in process 500 are shown in a particular order, certain operations may be performed in different orders or at the same time.

The process 500 begins at operation 505 where a user on a client device (e.g., a camera or a smart phone) captures an image associated with a point of interest (POI). The point of interest may be a business (e.g., a retail store, a restaurant, a doctor's office), a landmark (e.g., a museum, a neighborhood, etc.), or any other location that may be of interest to the user, other users, or the system. The image may be of the outside of the point of interest (e.g., a storefront or plaque in front of a landmark), a business card, the interior of a point of interest, or any other image associated with the point of interest.

At operation 510, the client device may generate a communication (e.g., an email, an MMS message, or a message in another format) that includes the image and transmit the communication to the server. In some aspects, the communication may include other information as well. For example, a camera or a smart phone may have location-determination capabilities, such as a global positioning system, that may be able to identify location coordinates associated with the image. The client device may also enable a user to input information to include in the communication. The client device may include the location coordinates and/or the user inputted information in the communication transmitted to the server.

In another aspect, the client device may provide a user interface that enables a user to input additional information that may be included in the communication. For example, if the phone number, business hours (e.g., opening hours), website, or address is not in an image of a business storefront, the user may input the missing information. This information may also be sent to the server in the communication to help the server update the POI data repository.

At operation 520, the communication from the client device may be received at the server. The server may perform one or more optical character recognition (OCR) techniques on the image in order to extract textual data from the image at operation 525. The textual data in the image may include information that may be used to identify a POI listing in the POI data repository or update a POI listing in the POI data repository, as well as information that may not be helpful.

To determine which information may be used, the server may parse the textual data extracted from the image and identify one or more portions of the textual data that correspond to POI fields (e.g., a POI name, a POI address, etc.) at operation 530. At operation 535, the one or more portions of textual data that correspond to the POI fields may be used to update the POI data repository. According to another aspect of the subject technology, the other information included in the communication received from the client device may also be used to update the POI data repository.

For example, the server may search for a POI listing in the POI data repository that corresponds to the information extracted or received in the communication from the client device. If a POI listing is found, the server may verify the information contained in the POI listing by comparing it to the information from the communication. If the information in the POI listing matches, the POI listing is verified. If there are differences between the information in the POI listing and the information from the communication, the POI listing may be updated with the information from the communication or flagged for further review by, for example, a system administrator.

If no POI listing is found, the server may generate a new POI listing using the information received in the communication from the client device and store the new POI listing in the POI data repository. According to some aspects, before storing the new POI listing in the POI data repository, the server may put the new POI listing in a queue for review by a system administrator (e.g., a review module or a human operator).

The system administrator may review the new POI listing, make changes to the new POI listing if deemed necessary by the system administrator, and approve or reject the new POI listing. If the new POI listing is rejected, it will not be stored in the POI data repository. If, on the other hand, the new POI listing is approved, the server may store the new POI listing in the POI data repository.

According to another aspect, when reviewing a new POI listing or an update to an existing POI listing, the system administrator may also be provided with components from the communication received from the client device. For example, where the system administrator is a human operator, the system may provide the human operator with the new or updated POI listing, the one or more images that were included in the communication, and any additional information (e.g., textual descriptions) that were included in the communication. Using the information provided by the server, the human operator may confirm that the new or updated POI listing is correct or make corrections as needed.

According to one aspect, the human operator may also add additional information to the new or updated POI listing based on the one or more images included in the communication. For example, the human operator may view an image associated with a point of interest (e.g., an image of a storefront or the interior of a POI) and observe visual indicators that may be used to fill out one or more fields of the POI listing.

In one scenario, the human operator may observe an image of a storefront with a multitude of shoes for sale on display. Using these visual indicators, the human operator may determine that the point of interest is a retail store and add "retail store" to the POI Type field of the POI listing. Additionally, the human operator may add the term "shoes," a brand name, or other keywords to the Related Terms field of the POI listing.

In a different scenario, the human operator may observe an image of the interior of a restaurant with dining tables, waiters, and patrons eating. Using these visual indicators, the human operator may determine that the point of interest is a restaurant and add "restaurant" to the POI Type field of the POI listing. Additionally, the human operator may add the terms associated with the visual indicators such as terms for the type of restaurant (e.g., Italian, fine dining, etc.) or other keywords to the Related Terms field of the POI listing.

According to one aspect of the subject technology, once the new POI listing is stored on the POI listing, the server may send a message to the user of the client device informing the user that the POI listing has been added to the POI data repository.

According to another aspect of the subject technology, the server may provide incentives for users to submit, to the server, communications that may be used to update the POI data repository. For example, the server may give a gift or a certain number of points redeemable for items to users who submit the communications.

According to another aspect, if the system administrator is a human operator, the server may also provide incentives for the human operators to review new POI listings or to review updates to existing POI listings.

According to one aspect of the subject technology, the images received by the interface module 410 may be used to search for POI listings in the POI data repository with the same or similar images. If one or more POI listings contains a similar or identical image, the information contained in the POI listings may be used to generate a new POI listing or update an existing POI listing. For example, the interface module 410 receives an image of a phone booth at one location and the system may use the image of the phone booth to search for other POI listings with the same or similar image (e.g., of a phone booth). If one or more POI listings are found, the system may use the information in those POI listings to generate a new POI listing for the image received by the interface module 410.

Figure 6:
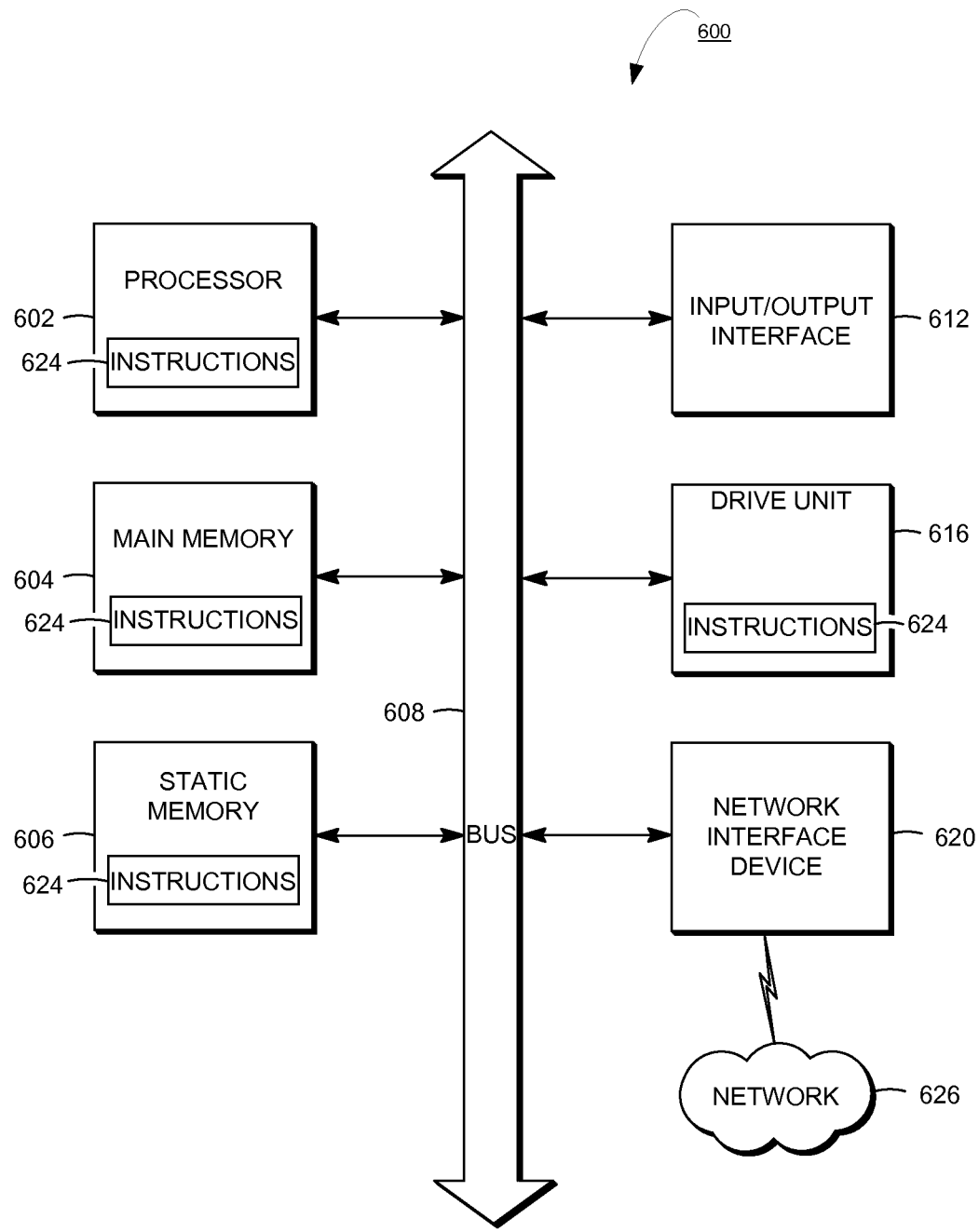
FIG. 6 is a block diagram illustrating a computer system with which any of the client devices, servers, or systems described may be implemented, in accordance with one aspect of the subject technology.

FIG. 6 is a block diagram illustrating a computer system with which any of the client devices, servers, or systems described may be implemented, in accordance with one aspect of the subject technology. In certain aspects, the computer system 600 may be implemented using hardware or a combination of software and hardware, either in a dedicated server, or integrated into another entity, or distributed across multiple entities.

The example computer system 600 includes a processor 602, a main memory 604, a static memory 606, a disk drive unit 616, and a network interface device 620 which communicate with each other via a bus 608. The computer system 600 may further include an input/output interface 612 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 602 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 624 embodying any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media. The instructions 624 may further be transmitted or received over a network 626 via the network interface device 620.

The machine-readable medium may be a single medium or multiple media (e.g., a centralized or distributed data repository, and/or associated caches and servers) that store the one or more sets of instructions. The machine-readable medium may include the drive unit 616, the static memory 606, the main memory 604, the processor 602, an external memory connected to the input/output interface 612, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for updating a point of interest (POI) data repository are thus provided herein. The system may include an interface module, a data extraction module, and a data repository module. The interface module may be configured to receive a communication comprising an image associated with a point of interest. The data extraction module may be configured to extract data from the image and the data repository module may be configured to update the POI data repository based on the extracted data.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for updating a point of interest (POI) data repository, the method comprising:
   receiving a communication comprising an image of an interior of a point of interest;
   extracting textual data from the image;
   identifying a portion of the textual data that corresponds to a point of interest (POI) field for a point of interest listing;
   updating the point of interest (POI) data repository to include at least some of the textual data extracted from the image based at least in part on the portion of the textual data that corresponds to the POI field for the point of interest listing; and
   updating the POI data repository with respect to a second point of interest (POI) field for the point of interest listing based on content depicted within the image that is associated with the interior of the point of interest.

2. The computer-implemented method of claim 1, wherein updating the POI data repository comprises:
   determining if a POI listing in the POI data repository contains information that matches the portion of the textual data;
   generating, if no POI listing contains information that matches with the portion of the textual data, a new POI listing that includes the at least some of the textual data extracted from the image based at least in part on the portion of the textual data that corresponds to the POI field; and storing the new POI listing in the POI data repository.

3. The computer-implemented method of claim 2, further comprising:

providing the new POI listing to a system administrator for approval before storing the new POI listing in the POI data repository.

4. The computer-implemented method of claim 3, wherein the system administrator is a human operator.

5. The computer-implemented method of claim 2, wherein if an existing POI listing containing information that matches the portion of the textual data is found in the POI data repository, the method further comprising:

updating the existing POI listing to include the at least some of the textual data extracted from the image.

6. The computer-implemented method of claim 5, wherein the communication comprising the image further includes additional information, and wherein the existing POI listing is updated based on the additional information.

7. The computer-implemented method of claim 6, wherein the additional information comprises additional textual data that corresponds to a third POI field.

8. The computer-implemented method of claim 6, wherein the additional information includes location coordinates.

9. The computer-implemented method of claim 1, wherein the POI field includes one of a POI name, a POI address, a POI phone number, a POI website, POI business hours, or a POI type.

10. The computer-implemented method of claim 1, wherein the point of interest is a business.

11. A system for updating a point of interest (POI) data repository, the system comprising:

one or more processors; and a machine-readable medium comprising instructions stored therein, which when executed by the one or more processors, cause the one or more processors to perform operations comprising:

receiving one or more communications comprising a plurality of images associated with a point of interest, a first image of the plurality of images being captured within an interior of the point of interest;

extracting textual data from at least one image of the plurality of images using optical character recognition;

identifying a portion of the textual data that corresponds to a point of interest (POI) field;

updating the point of interest (POI) data repository to include at least some of the textual data extracted from the at least one image based at least in part on the portion of the textual data that corresponds to the POI field; and updating the POI data repository with respect to a second point of interest (POI) field based on content depicted within the first image that is associated with the interior of the point of interest.

12. The system of claim 11, the operations further comprising:

searching for a POI listing in a POI data repository containing information that matches the portion of the textual data;

generating a new POI listing that includes the at least some of the textual data extracted from the image if no POI listing is found; and storing the new POI listing in the POI data repository.

13. The system of claim 12, wherein if an existing POI listing containing information that matches the portion of the textual data is found, the operations further comprise updating the existing POI listing to include the at least some of the textual data extracted from the image.

14. The system of claim 11, wherein the one or more communications further include additional information, and wherein the POI data repository is updated based on the additional information.

15. The system of claim 14, wherein the additional information comprises additional textual data that corresponds to a third POI field.

16. The system of claim 14, wherein the additional information includes at least one of location coordinates or text inputted by a user.

17. A non-transitory machine-readable medium comprising instructions stored therein, which when executed by a machine, cause the machine to perform operations comprising:

receiving a communication comprising an image of an interior of a point of interest;

extracting textual data from the image;

identifying a portion of the textual data that corresponds to a point of interest (POI) field;

identifying content depicted within the image that is associated with the interior of the point of interest, the content corresponding to a second point of interest (POI) field generating a new point of interest (POI) listing based at least in part on the portion of the textual data that corresponds to the POI field and the content that corresponds to the second POI field, the new POI listing comprising at least some of the textual data extracted from the image.

18. The machine-readable medium of claim 17, wherein the operations further comprise:

providing the new POI listing to a system administrator for review;

receiving an approval indication from the system administrator, and adding the new POI listing to a POI data repository based on the approval indication.

19. The machine-readable medium of claim 18, wherein the system administrator is a human operator.

* * * * *